us009330715B1

United States Patent
Lee

(10) Patent No.: US 9,330,715 B1
(45) Date of Patent: May 3, 2016

(54) MAPPING OF SHINGLED MAGNETIC RECORDING MEDIA

(71) Applicant: Western Digital Technologies, Inc., Irvine, CA (US)

(72) Inventor: Joe C. Lee, Fullerton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 252 days.

(21) Appl. No.: 13/928,156

(22) Filed: Jun. 26, 2013

Related U.S. Application Data

(60) Provisional application No. 61/823,241, filed on May 14, 2013.

(51) Int. Cl.
| | |
|---|---|
| *G11B 5/09* | (2006.01) |
| *G11B 20/18* | (2006.01) |
| *G06F 3/06* | (2006.01) |
| *G11B 20/12* | (2006.01) |

(52) U.S. Cl.
CPC .......... *G11B 20/1889* (2013.01); *G06F 3/0676* (2013.01); *G11B 20/1883* (2013.01); *G11B 2020/1238* (2013.01)

(58) Field of Classification Search
CPC ............ G06F 21/78; G06F 2221/2141; G06F 2221/2149; G06F 3/0676; G11C 16/349; G11B 2220/216; G11B 2220/20; G11B 7/007; G11B 2020/1232; G11B 27/034; G11B 20/1217; G11B 2020/1267; G11B 20/1426; G11B 27/19; G11B 27/24; G11B 20/00086; G11B 2020/1238; G11B 20/00746; G11B 20/1883; G11B 2220/2516; G11B 20/1258
See application file for complete search history.

(56) References Cited

U.S. PATENT DOCUMENTS

| | | | |
|---|---|---|---|
| 4,769,770 | A | 9/1988 | Miyadera et al. |
| 4,992,936 | A | 2/1991 | Katada et al. |
| 5,121,480 | A | 6/1992 | Bonke et al. |
| 5,293,282 | A | 3/1994 | Squires et al. |
| 5,613,066 | A | 3/1997 | Matsushima et al. |
| 5,983,309 | A | 11/1999 | Atsatt et al. |
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |

(Continued)

FOREIGN PATENT DOCUMENTS

WO     2009/102425     8/2009

OTHER PUBLICATIONS

Rosenblum, Mendel and Ousterhout, John K. (Feb. 1992), "The Design and Implementation of a Log-Structured File System." ACM Transactions on Computer Systems, vol. 10, Issue 1, pp. 26-52.

(Continued)

*Primary Examiner* — Hashem Farrokh

(57) ABSTRACT

Mapping out restricted areas on at least one disk of a data storage device. The at least one disk includes overlapping tracks with a plurality of sectors for storing data. A first addressing is provided for the plurality of sectors on the at least one disk. Defective sectors of the plurality of sectors are detected and mapped out from the first addressing. A restricted area is calculated including sectors of the plurality of sectors and the restricted area is mapped out from a second addressing.

15 Claims, 7 Drawing Sheets

(56) References Cited

U.S. PATENT DOCUMENTS

Figure 1A:
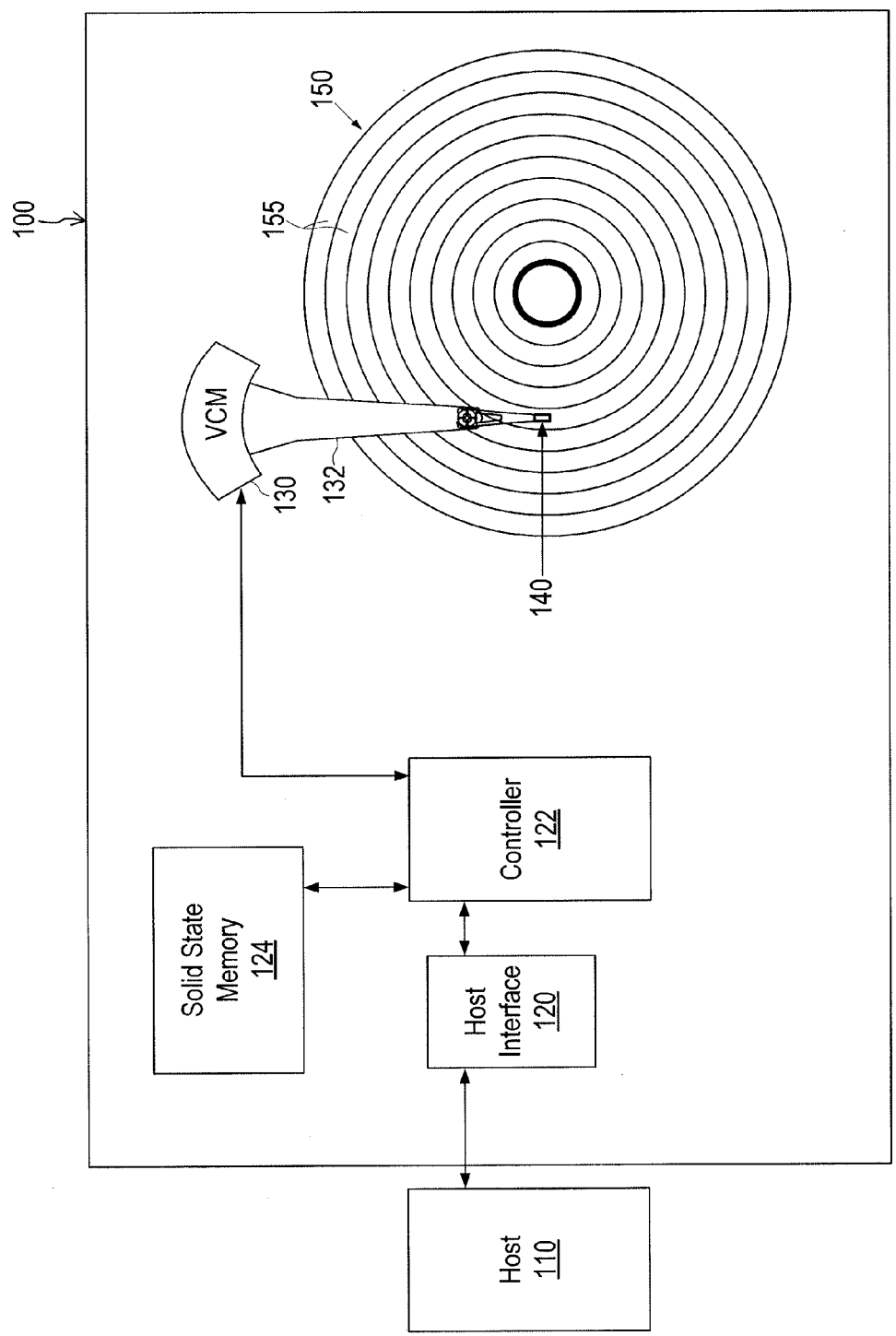

| | | | |
|---|---|---|---|
| 6,092,231 A | 7/2000 | Sze |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,182,250 B1 | 1/2001 | Ng et al. |
| 6,182,550 B1 | 2/2001 | Brewington et al. |
| 6,191,909 B1 | 2/2001 | Cloke et al. |
| 6,195,218 B1 | 2/2001 | Guttmann et al. |
| 6,202,121 B1 | 3/2001 | Walsh et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,240,501 B1 | 5/2001 | Hagersten |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,324,604 B1 | 11/2001 | Don et al. |
| 6,327,106 B1 | 12/2001 | Rothberg |
| 6,337,778 B1 | 1/2002 | Gagne |
| 6,339,811 B1 | 1/2002 | Gaertner et al. |
| 6,341,045 B1 * | 1/2002 | Hironaka et al. ............... 360/48 |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,454 B1 | 6/2002 | Monroe, III |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,556,365 B2 | 4/2003 | Satoh |
| 6,574,774 B1 | 6/2003 | Vasiliev |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,636,049 B1 | 10/2003 | Lim et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,538 B1 | 2/2004 | Saito et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,728,054 B2 | 4/2004 | Chng et al. |
| 6,735,032 B2 | 5/2004 | Dunn et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,274 B1 | 8/2004 | Estakhri |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,829,688 B2 | 12/2004 | Grubbs et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,886,068 B2 | 4/2005 | Tomita |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,468 B2 | 5/2005 | Rege et al. |
| 6,895,500 B1 | 5/2005 | Rothberg |
| 6,898,730 B1 | 5/2005 | Hanan |
| 6,901,479 B2 | 5/2005 | Tomita |
| 6,910,099 B1 | 6/2005 | Wang et al. |
| 6,920,455 B1 | 7/2005 | Weschler |

(56) References Cited

U.S. PATENT DOCUMENTS

| | | |
|---|---|---|
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,956,710 B2 | 10/2005 | Yun et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,967,810 B2 | 11/2005 | Kasiraj et al. |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,980,386 B2 | 12/2005 | Wach et al. |
| 6,983,316 B1 | 1/2006 | Milne et al. |
| 6,986,007 B1 | 1/2006 | Procyk et al. |
| 6,986,154 B1 | 1/2006 | Price et al. |
| 6,992,852 B1 | 1/2006 | Ying et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,012,771 B1 | 3/2006 | Asgari et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,035,961 B2 | 4/2006 | Edgar et al. |
| 7,046,465 B1 | 5/2006 | Kupferman |
| 7,046,471 B2 | 5/2006 | Meyer et al. |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,391 B1 | 7/2006 | Pakzad et al. |
| 7,076,604 B1 | 7/2006 | Thelin |
| 7,082,007 B2 | 7/2006 | Liu et al. |
| 7,082,494 B1 | 7/2006 | Thelin et al. |
| 7,088,538 B1 | 8/2006 | Codilian et al. |
| 7,088,545 B1 | 8/2006 | Singh et al. |
| 7,089,355 B2 | 8/2006 | Auerbach et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,113,358 B2 | 9/2006 | Zayas et al. |
| 7,114,029 B1 | 9/2006 | Thelin |
| 7,120,726 B2 | 10/2006 | Chen et al. |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,448 B2 | 12/2006 | Winter |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,199,981 B2 | 4/2007 | Zabtcioglu |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,254,671 B2 | 8/2007 | Haswell |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,283,316 B2 | 10/2007 | Chiao et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,298,568 B2 | 11/2007 | Ehrlich et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,343,517 B2 | 3/2008 | Miller et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,408,731 B2 | 8/2008 | Uemura et al. |
| 7,412,585 B2 | 8/2008 | Uemura |
| 7,415,571 B1 | 8/2008 | Hanan |
| 7,436,610 B1 | 10/2008 | Thelin |
| 7,436,614 B2 | 10/2008 | Uchida |
| 7,437,502 B1 | 10/2008 | Coker |
| 7,440,214 B1 | 10/2008 | Ell et al. |
| 7,440,224 B2 | 10/2008 | Ehrlich et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,486,460 B2 | 2/2009 | Tsuchinaga et al. |
| 7,490,212 B2 | 2/2009 | Kasiraj et al. |
| 7,496,493 B1 | 2/2009 | Stevens |
| 7,509,471 B2 | 3/2009 | Gorobets |
| 7,516,267 B2 | 4/2009 | Coulson et al. |
| 7,518,819 B1 | 4/2009 | Yu et al. |
| 7,526,184 B1 | 4/2009 | Parkinen et al. |
| 7,529,880 B2 | 5/2009 | Chung et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,603,530 B1 | 10/2009 | Liikanen et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |

(56) References Cited

U.S. PATENT DOCUMENTS

| | | |
|---|---|---|
| 7,669,044 B2 | 2/2010 | Fitzgerald et al. |
| 7,672,072 B1 | 3/2010 | Boyle et al. |
| 7,673,075 B1 | 3/2010 | Masiewicz |
| 7,685,360 B1 | 3/2010 | Brunnett et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,840,878 B1 | 11/2010 | Tang et al. |
| 7,843,660 B1 | 11/2010 | Yeo |
| 7,852,596 B2 | 12/2010 | Boyle et al. |
| 7,859,782 B1 | 12/2010 | Lee |
| 7,860,836 B1 | 12/2010 | Natanzon et al. |
| 7,872,822 B1 | 1/2011 | Rothberg |
| 7,885,921 B2 | 2/2011 | Mahar et al. |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,031,423 B1 | 10/2011 | Tsai et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,179,627 B2 | 5/2012 | Chang et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,341,339 B1 | 12/2012 | Boyle et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,443,167 B1 | 5/2013 | Fallone et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker |
| 8,693,133 B1 | 4/2014 | Lee |
| 8,694,841 B1 | 4/2014 | Chung et al. |

(56) References Cited

U.S. PATENT DOCUMENTS

| | | |
|---|---|---|
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,856,438 B1 * | 10/2014 | Warner et al. .............. 711/112 |
| 2001/0042166 A1 | 11/2001 | Wilson et al. |
| 2003/0065872 A1 | 4/2003 | Edgar et al. |
| 2003/0220943 A1 | 11/2003 | Curran et al. |
| 2004/0019718 A1 | 1/2004 | Schauer et al. |
| 2004/0109376 A1 | 6/2004 | Lin |
| 2005/0069298 A1 | 3/2005 | Kasiraj et al. |
| 2005/0071537 A1 | 3/2005 | New et al. |
| 2005/0138265 A1 | 6/2005 | Nguyen et al. |
| 2005/0144517 A1 | 6/2005 | Zayas |
| 2005/0157416 A1 | 7/2005 | Ehrlich et al. |
| 2006/0090030 A1 | 4/2006 | Ijdens et al. |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2007/0016721 A1 | 1/2007 | Gay |
| 2007/0067603 A1 | 3/2007 | Yamamoto et al. |
| 2007/0174582 A1 | 7/2007 | Feldman |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055620 A1 | 2/2009 | Feldman et al. |
| 2009/0063548 A1 | 3/2009 | Rusher et al. |
| 2009/0113702 A1 | 5/2009 | Hogg |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0271581 A1 | 10/2009 | Hinrichs, Jr. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |
| 2010/0306551 A1 | 12/2010 | Meyer et al. |
| 2011/0119498 A1 * | 5/2011 | Guyot ........................... 713/189 |
| 2011/0167049 A1 | 7/2011 | Ron |
| 2011/0226729 A1 | 9/2011 | Hogg |
| 2011/0304935 A1 | 12/2011 | Chang et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0303889 A1 * | 11/2012 | Coker et al. ................. 711/113 |
| 2012/0324980 A1 | 12/2012 | Nguyen et al. |
| 2013/0038961 A1 * | 2/2013 | Song .............................. 360/49 |
| 2014/0201424 A1 | 7/2014 | Chen et al. |

OTHER PUBLICATIONS

Rosenblum, "The Design and Implementation of a Log-structured File System", EECS Department, University of California, Berkeley, Technical Report No. UCB/CSD-92-696, Jun. 1992.

Amer, et al., "Design Issues for a Shingled Write Disk System", 26th IEEE Symposium on Massive Storage Systems and Technologies: Research Track (MSST 2010), May 2010, 12 pages.

Definition of adjacent, Merriam-Webster Dictionary, retrieved from http://www.merriam-webster.com/dictionary/adjacent on Oct. 30, 2013 (1 page).

RE:Hard drive Inner or Outer tracks???, Matthias99, Apr. 12, 2004, retrieved from http://forums.anandtech.com/showthread.php?p=11 055300 on Oct. 29, 2013.

You Don't Know Jack about Disks, Dave Anderson, Seagate Technologies, Queue—Storage Queue, vol. 1, issue 4, Jun. 2003, pp. 20-30 (11 pages).

William B. Boyle, U.S. Appl. No. 13/329,053, filed Dec. 16, 2011, 29 pages.

* cited by examiner

| ABA | 0 | 1 | 2 | 3 | 4 | 5 | 6 | 7 | 8 |
|---|---|---|---|---|---|---|---|---|---|
| Block | good | good | bad | bad | good | bad | good | bad | good |
| LBA | 0 | 1 | | | 2 | | 3 | | 4 |

A: Start_ABA
B: Start_SBA
C: Start_Guardband_ABA

MAPPING OF SHINGLED MAGNETIC RECORDING MEDIA

CROSS-REFERENCE TO RELATED APPLICATIONS

This application claims the benefit of U.S. Provisional Application No. 61/823,241, filed on May 14, 2013, which is hereby incorporated by reference in its entirety, and hereby incorporates by reference in their entirety U.S. application Ser. No. 13/316,039, filed on Dec. 9, 2011, U.S. application Ser. No. 13/709,470, filed on Dec. 10, 2012, and U.S. application Ser. No. 12/729,159, filed on Mar. 22, 2010.

BACKGROUND

In a shingled magnetic recording (SMR) drive, data tracks are written in a partially overlapped manner to increase data density and overall drive capacity. An SMR drive may be divided into multiple shingle zones according to one approach of formatting an SMR drive. In such a case, each shingle zone has a user data area and a guardband area. Due to the overlapping nature of the written tracks, a guardband may be necessary to separate two adjacent shingle zones to prevent data corruption.

BRIEF DESCRIPTIONS OF THE DRAWINGS

The features and advantages of the implementations of the present disclosure will become more apparent from the detailed description set forth below when taken in conjunction with the drawings. The drawings and the associated descriptions are provided to illustrate implementations of the disclosure and not to limit the scope of what is claimed.

Figure 1B:
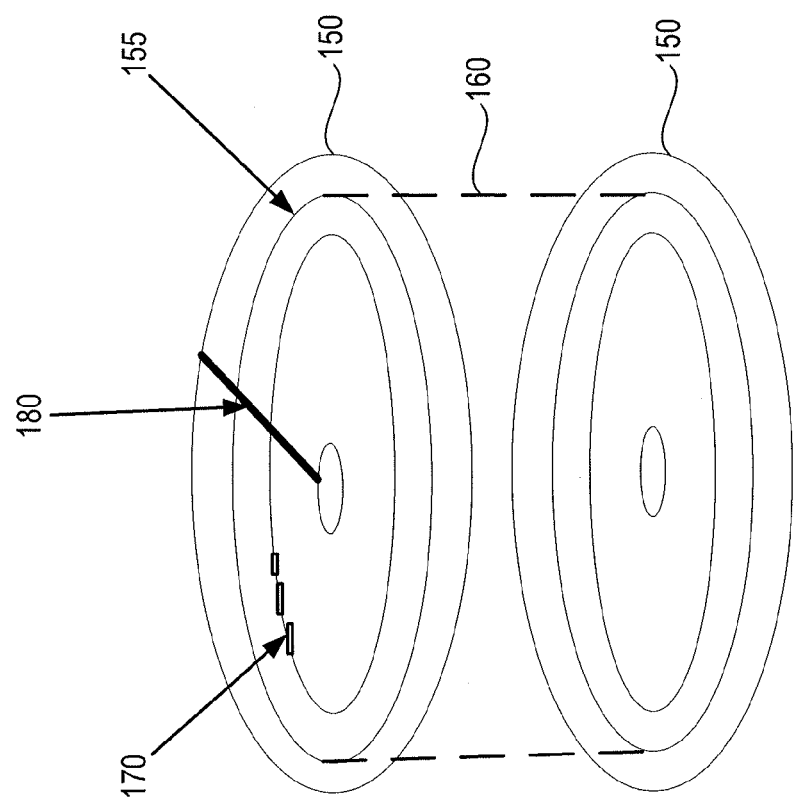
Figures 2A, 2B:
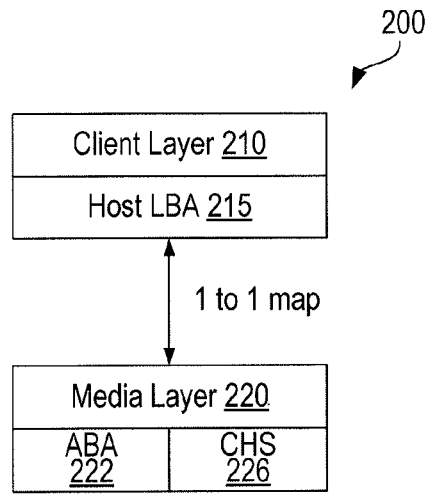
Figure 3B:
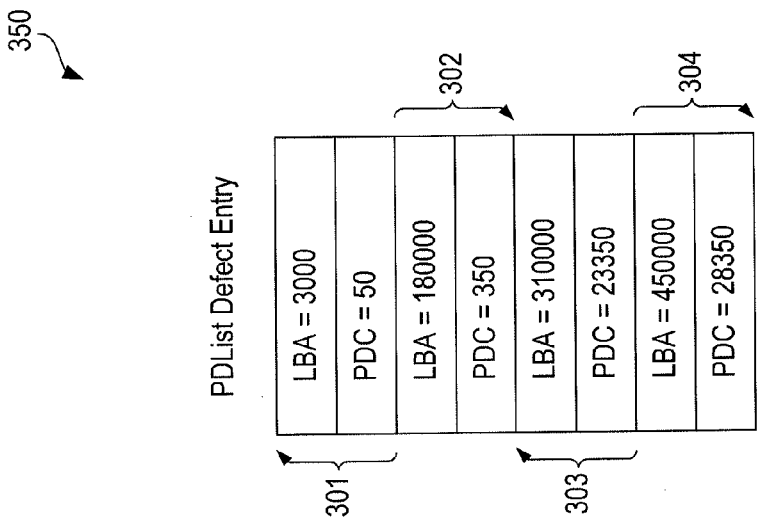
Figure 3A:
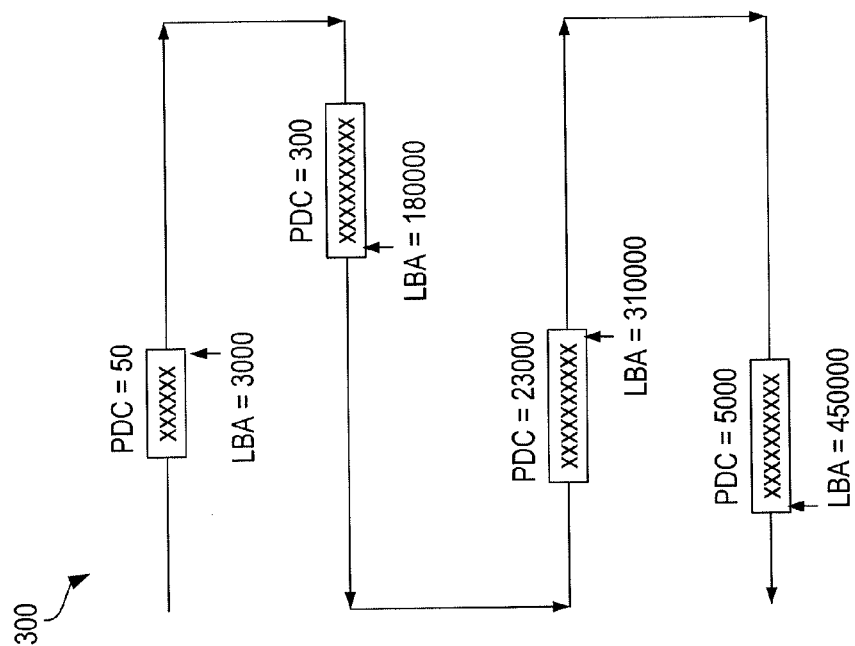
Figure 4A:
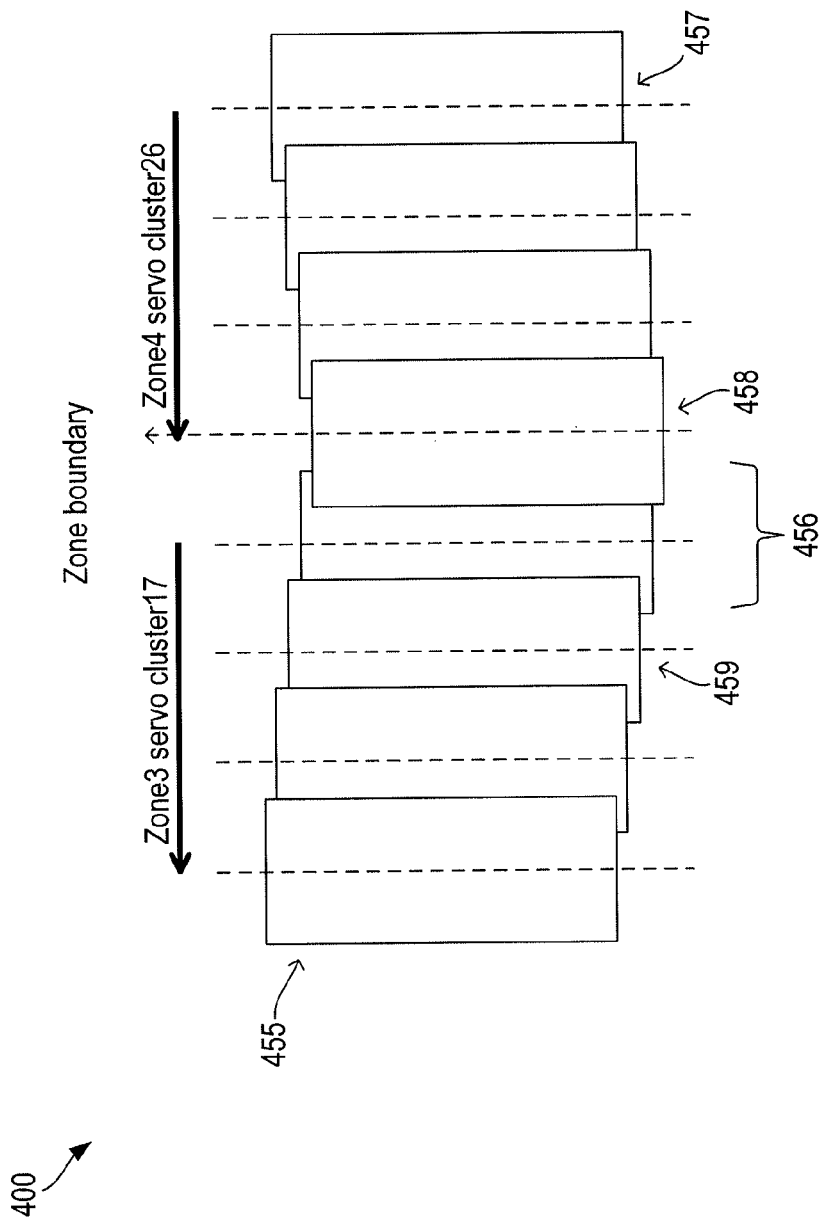
Figure 4B:
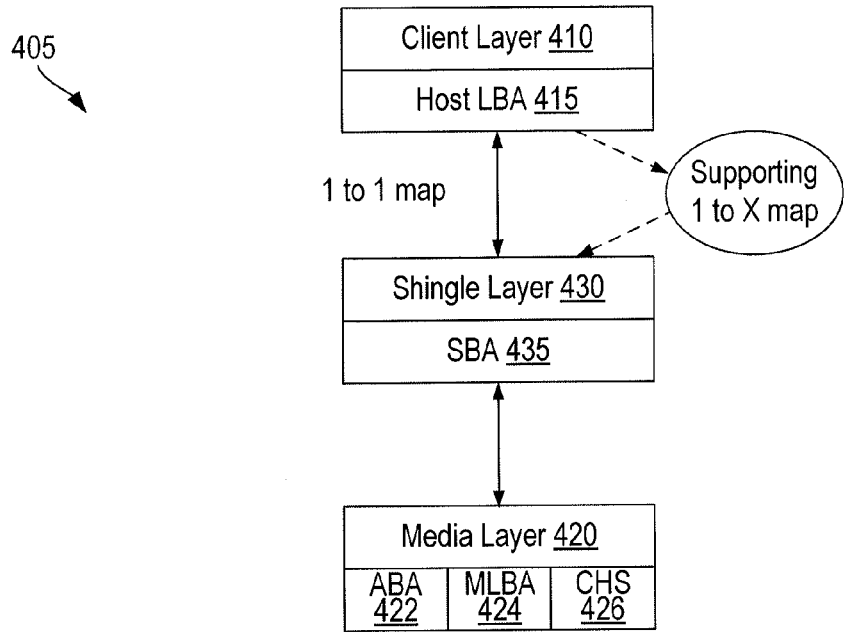
Figure 4C:
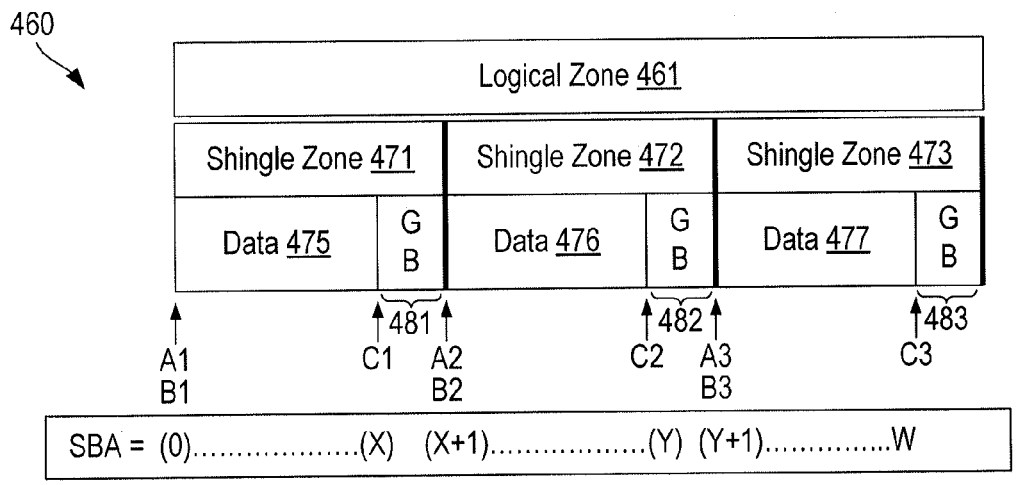
Figure 5:
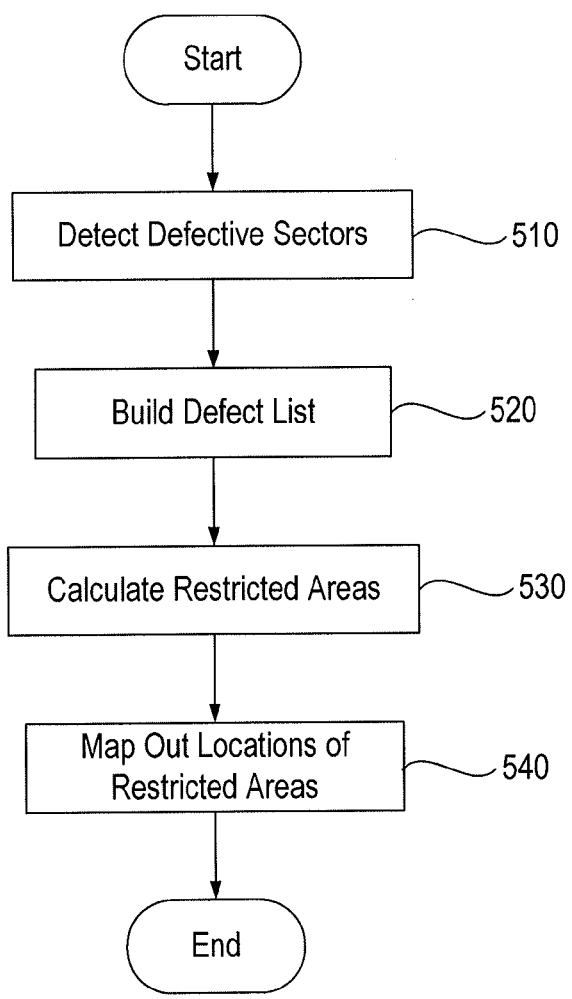

FIG. 1A presents a block diagram of a data storage device according to one implementation of the present disclosure;

FIG. 1B presents a diagram of hard disk platters according to one implementation of the present disclosure;

FIG. 2A presents a diagram of a simple mapping scheme according to one implementation of the present disclosure;

FIG. 2B presents a table of sector counts according to one implementation of the present disclosure;

FIG. 3A presents a conceptual diagram illustrating a count of defective sectors according to one implementation of the present disclosure;

FIG. 3B presents a defect list corresponding to the diagram of FIG. 3A according to one implementation of the present disclosure;

FIG. 4A presents a conceptual diagram of shingled tracks according to one implementation of the present disclosure;

FIG. 4B presents a diagram of a mapping scheme according to one implementation of the present disclosure;

FIG. 4C presents a diagram of mapped out zones according to one implementation of the present disclosure; and FIG. 5 presents a flowchart of a data storage device format operation according to one implementation of the present disclosure.

DETAILED DESCRIPTION

In the following detailed description, numerous specific details are set forth to provide a full understanding of the present disclosure. It will be apparent, however, to one of ordinary skill in the art that the various implementations disclosed may be practiced without some of these specific details. In other instances, well-known structures and techniques have not been shown in detail to avoid unnecessarily obscuring the various implementations.

FIG. 1 presents one implementation of a data storage device (DSD) 100 connected to a host 110. The host 110 may be a computer, such as a desktop, a laptop, or a mobile device. The DSD 100 includes a host interface 120, a controller 122, a voice coil motor (VCM) 130, an actuator arm 132, a head 140, and a platter 150. The DSD 100 also includes a solid state memory 124, but other implementations may not have the solid state memory 124. The solid state memory 124 may be used as an internal cache, or may be available for storing data from the host 110.

The host 110 communicates to the DSD 100 through the host interface 120. The host interface 120 communicates with the controller 122, which further communicates with the solid state memory 124 and the VCM 130. The VCM 130 operates in conjunction with the actuator arm 132 to position the head 140 over a desired track 155 of the platter 150. Although not shown in FIG. 1, another head 140 is positioned adjacent a bottom surface of the platter 150 such that both sides of the platter 150 can be utilized. Further, the DSD 100 has multiple platters 150, each having two heads 140.

To operate (i.e. read, write, etc.) on a desired location or sector of the platter 150, the VCM moves the head 140 to the desired sector. FIG. 1B illustrates how locations on the platter 150 are located. Each platter 150 has sectors 170, which are the smallest storage unit addressable by the DSD 100. The sectors 170 are numbered, starting from the index line 180 having a physical sector number (PSN) of 0. The servo track 155 is a thin, concentric circular strip of sectors 170. A cylinder 160 maps to servo tracks 155 having the same radial location on each platter 150. Because each platter 150 has two usable sides, and a head 140 for each side, identifying the head 140 will identify a specific side of a platter 150. Thus, the combination of cylinder-head-sector (CHS) locations provides an address to each physical block of data on the DSD 100. To simplify the addressing scheme, the CHS address may be mapped to absolute block addresses (ABA), which are numbered starting from 0 in one implementation. FIG. 2A presents a diagram 200 depicting how this addressing scheme may be used. In the discussion below, "sectors" and "blocks" are used interchangeably unless otherwise indicated.

In FIG. 2A, the client layer 210 corresponds to the host 110, and the media layer 220 corresponds to the DSD 100. As seen in FIG. 2A, the media layer 220 uses ABA 222 and CHS 226, whereas the client layer 210 does not. The client layer 210 instead uses a host logical block address (LBA) 215.

Defects may be present on the platters 150. In other words, certain sectors 170 may not be usable. However, ABA addressing includes all blocks, good or bad. To prevent the bad blocks from being used, another addressing scheme may be used to skip over the bad blocks. FIG. 2B presents a table 230 depicting how LBA addressing skips over bad sectors. As seen in table 230, ABA starts with 0, and assigns the next number to each consecutive block. LBA also starts with 0, but only numbers the good blocks. Because ABA 2 and 3 are bad, they are not assigned an LBA. The next LBA after 1 is assigned to ABA 4. By ABA 8, the LBA is at 4, the difference between the two also corresponding to the cumulative number of defects. The accumulated defect sector counts for a particular ABA is the push down count (PDC). Thus, the ABA can be calculated as the sum of the LBA and the PDC.

Returning to FIG. 2A, the client layer 210 uses the host LBA 215 and the media layer 220 uses the ABA 222. The host LBA 215 may map 1 to 1 with the ABA 222. In certain implementations, the host LBA 215 is the same as the ABA 222.

FIG. 3A presents a diagram 300 illustrating how a primary push down list (PDList) 350 in FIG. 3B is determined. In FIG. 3A, there are 50 bad sectors immediately preceding LBA 3000. Entry 301 in the PDList 350 stores this information. There are 300 bad sectors immediately preceding LBA 180000. However, entry 302 of the PDList 350 stores a PDC of 350 (300+50) because it tracks a cumulative count. By knowing the cumulative count, the ABA can be calculated for a given LBA. For instance, LBA 180000 maps to ABA 180350. Similarly, 23000 bad sectors precede LBA 310000, having a PDC of 23350, and 5000 bad sectors precede LBA 450000, having a PDC of 28350.

Shingled magnetic recording (SMR) can improve the density of magnetic disk storage, such as the platters 150. Writing data to a magnetic medium generally requires a stronger magnetic field than reading data. As such, the head 140 writes a wide track, but reads a narrow track. SMR takes advantage of the discrepancy between the width of the written track and the width of the read track. The tracks can be placed closer to improve density. Because only a narrow track is read, the rest of the wide written track can be overwritten while maintaining the integrity of the narrow track for reading. As long as the narrow track is not overwritten, adjacent tracks may overlap.

FIG. 4A presents a conceptual diagram 400 of shingled tracks 455. The tracks 455 overlap like roof shingles. In FIG. 4A, with no guardband in place, writing may begin with track 456, with successive tracks 455, such as track 459, overlapping the left side of the previous track. Writing may continue with the rightmost track 457, and continuing left to track 458. However, the track 456 gets overlapped on both sides, becoming unreadable. In order to preserve data integrity, the track 456 is restricted or otherwise reserved and not used, designated as a guardband.

To ensure the guardbands and other restricted areas are not used, they must be mapped out during the drive formatting process. To use conventional mapping schemes, the restricted areas may be treated as defects. However, due to the large number of shingle zones (e.g. 20,000 shingle zones), many sectors are designated as defective in such conventional mapping schemes. As a result, conventional mapping schemes would require larger tables and more processing time. For example, the guardband, or other restricted areas such as write logs can be treated as defects and added to the PDList. A write log of a track contains metadata of the written user data on that track. There may be two write logs per track for redundancy purposes. For example, one write log near the middle of a track may refer to the first half of the track, and a second write log near the end of the track may refer to the second half of the track. The host LBA would not have addresses for the restricted areas, similar to actual defects. Before the DSD 100 is used, it must build the PDList. However, because entire tracks or significant portions of tracks may be restricted, the iterative process of building the PDList becomes a time-consuming process, as each sector is essentially checked as good or bad/restricted.

FIG. 4B presents a chart 405 of a mapping scheme according to an implementation of the present disclosure. Similar to the chart 200 in FIG. 2A, a client layer 410 uses a host LBA 415, and a media layer 420 uses an ABA 422, a CHS 426, and further uses a media logical block address (MLBA) 424. However, in contrast to the chart 200, the chart 405 uses an additional layer, a shingle layer 430 using a shingle block address (SBA) 435. Similar to how LBA addresses skip over defective blocks, the SBA 435 does not assign addresses to restricted blocks. The shingle layer 430 can support a 1-to-1 mapping of addresses from the host LBA 415 to the SBA 435. The shingle layer 430 also supports a 1-to-many mapping of addresses from the host LBA 415 to the SBA 435.

FIG. 4C presents a diagram 460 of a shingle zone layout according to an implementation of the present disclosure. A logical zone 461 has shingle zone 471, shingle zone 472, and shingle zone 473. The shingle zone 471 includes a data portion 475 and a guardband 481. The shingle zone 472 has a data portion 476 and a guardband 482. The shingle zone 473 has a data portion 477 and a guardband 483. The data portions 475, 476, and 477 may be available for reading and storing data from the host. The guardbands 481, 482, and 483 are restricted.

The positions labeled with A demark the starting ABA of each shingle zone 471-473. The positions labeled with B demark the starting SBA of the shingle zones 471-473. The positions labeled C demark the starting ABA of the guardbands 481-483. Although in certain implementations MLBA or CHS are used rather than ABA, for the sake of simplicity, ABA is described in FIG. 4C. For the shingle zone 471, the ABA addresses start at A1 (0) and increment through C1 up to A2. A2 starts with the next value. However, the SBA addresses start with B1 (0), and increments through C1 (X). B2 starts with the value after C1 (X+1), skipping over the guardband 481. Likewise, B3 starts at Y+1. Thus, the restricted areas, such as the guardbands 481-483, are not assigned SBAs.

Mapping out the SBAs avoids the time-intensive process of building the PDList with restricted areas mapped as defects. The SBAs can be mapped out in a separate process. In addition, because the restricted areas are not random or nondeterministic sectors, such as defects, the process can take advantage of being able to calculate the restricted areas rather than having to iteratively inspect each sector. In other words, because SBA mapping follows a predictable pattern and defect mapping does not, separating the two mapping processes enhances the efficiency of the overall process. The mapping could also be done in the field rather than at the factory. For instance, the PDList may be rebuilt on the fly to account for new defects. The SBAs would be remapped afterwards.

FIG. 5 presents a flowchart 500 of one formatting process which can be performed by the controller 122 of the DSD 100 according to an implementation of the present disclosure. At 510, defective sectors are detected for building a PDList. This may be an iterative process of checking each sector. In other implementations, other suitable methods may be used to detect the defective sectors. In addition, this defect detection may occur at the factory during a manufacturing process, or could be initiated on the fly while in the field. At 520, the defect list is built. The PDList may be an array or matrix, such as PDList 350. In other implementations, 510 and 520 may be reversed, combined, and/or performed simultaneously.

At 530, the restricted areas are calculated. By knowing or setting various parameters, the restricted areas can be calculated. For example, if the number of good sectors, percent of sectors to use as guardbands, number of shingle zones, and number of tracks per shingle zone are known, the average shingle zone size can be calculated, and further used to calculate the guardband sizes and locations. With the parameters kept static, the guardband locations will be consistent for subsequent calculations. Taking advantage of the calculable nature of the restricted areas yields significant reductions in time over conventional mapping schemes. In other implementations, the restricted areas may be calculated by other algorithms.

At 540, the locations of the restricted areas are mapped out. For example, SBAs are mapped to good blocks, but not assigned to restricted areas. The mapping may also take advantage of the calculable nature of the restricted areas. In other implementations, 530 and 540 may be combined or performed simultaneously.

Having the restricted areas calculated for an SBA layer provides for a quicker mapping of restricted areas and does not overburden the defect detection process. In this regard, the PDList may be unsuitable for storing the guardbands and other restricted areas as defects. For example, the PDList may only hold about 30,000 entries. A DSD may have 10,000 shingle zones, each requiring two guardbands or restricted areas for a total of at least 20,000 entries as defects. Building the PDList with the guardbands as defects may take hours. In contrast, the SBA calculation may take less than a minute.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example implementations is provided to enable any person of ordinary skill in the art to make or use the implementations in the present disclosure. Various modifications to these examples will be readily apparent to those of ordinary skill in the art, and the principles disclosed herein may be applied to other examples without departing from the spirit or scope of the present disclosure. The described implementations are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for mapping out restricted areas on at least one disk of a data storage device (DSD), wherein the at least one disk includes overlapping tracks with a plurality of sectors for storing data, the method comprising:
    providing a first addressing for the plurality of sectors on the at least one disk;
    detecting defective sectors of the plurality of sectors;
    mapping out the defective sectors from the first addressing;
    calculating a restricted area for a guardband of sectors for a shingle zone of overlapping tracks or for a write log; and
    mapping out the restricted area from a second addressing.

2. The method of claim 1, wherein the DSD is in communication with a host using host logical block addresses (LBAs) to identify data, and wherein the second addressing is configured to provide a 1-to-1 mapping of the host LBAs to addresses of the second addressing.

3. The method of claim 1, wherein the DSD is in communication with a host using host logical block addresses (LBAs) to identify data, and wherein the second addressing is configured to provide a 1-to-many mapping of the host LBAs to addresses of the second addressing.

4. The method of claim 1, wherein calculating the restricted area is based on at least one of a number of tracks on the at least one disk, a number of non-defective sectors, an average number of sectors per track, an average number of non-defective sectors in a zone of tracks, a number of zones of tracks per area on the at least one disk having the same number of sectors per track, and a number of tracks per zone of tracks.

5. The method of claim 1, wherein calculating the restricted area is based on at least one of a percent of sectors to use as guardbands, a number of guardband tracks, a number of shingle zones, an average number of non-defective sectors per shingle zone, a number of shingle zones per area on the at least one disk having a same number of sectors per track, and a number of tracks per shingle zone.

6. The method of claim 1, wherein the DSD is in communication with a host and wherein the method further comprises recalculating the restricted area and re-mapping out the restricted area from the second addressing in response to a request from the host.

7. A data storage device (DSD) comprising:
    at least one disk including a plurality of overlapping tracks with a plurality of sectors for storing data; and
    a controller configured to:
        provide a first addressing for the plurality of sectors on the at least one disk;
        detect defective sectors of the plurality of sectors;
        map out the defective sectors from the first addressing;
        calculate a restricted area for a guardband of sectors for a shingle zone of overlapping tracks or for a write log; and
        map out the restricted area from a second addressing.

8. The DSD of claim 7, wherein the DSD is in communication with a host using host logical block addresses (LBAs)

to identify data, and wherein the second addressing is configured to provide a 1-to-1 mapping of the host LBAs to addresses of the second addressing.

9. The DSD of claim 7, wherein the DSD is in communication with a host using host logical block addresses (LBAs) to identify data, and wherein the second addressing is configured to provide a 1-to-many mapping of the host LBAs to addresses of the second addressing.

10. The DSD of claim 7, wherein the controller is further configured to calculate the restricted area based on at least one of a number of tracks on the at least one disk, a number of non-defective sectors, an average number of sectors per track, an average number of non-defective sectors in a zone of tracks, a number of zones of tracks per area on the at least one disk having the same number of sectors per track, and a number of tracks per zone of tracks.

11. The DSD of claim 7, wherein the controller is further configured to calculate the restricted area based on at least one of a percent of sectors to use as guardbands, a number of guardband tracks, a number of shingle zones, an average number of non-defective sectors per shingle zone, a number of shingle zones per area on the at least one disk having a same number of sectors per track, and a number of tracks per shingle zone.

12. A non-transitory computer-readable medium storing computer-executable instructions for mapping out restricted areas on at least one disk of a data storage device (DSD), wherein the at least one disk includes overlapping tracks with a plurality of sectors for storing data, and wherein when the computer-executable instructions are executed by a processor or a controller, the computer-executable instructions cause the processor or the controller to:

provide a first addressing for the plurality of sectors on the at least one disk;

detect defective sectors of the plurality of sectors;

map out the defective sectors from the first addressing;

calculate a restricted area for a guardband of sectors for a shingle zone of overlapping tracks or for a write log; and map out the restricted area from a second addressing.

13. The non-transitory computer-readable medium of claim 12, wherein the DSD is in communication with a host using host logical block addresses (LBAs) to identify data, and wherein the second addressing is configured to provide a 1-to-1 mapping of the host LBAs to addresses of the second addressing.

14. The non-transitory computer-readable medium of claim 12, wherein the DSD is in communication with a host using host logical block addresses (LBAs) to identify data, and wherein the second addressing is configured to provide a 1-to-many mapping of the host LBAs to addresses of the second addressing.

15. The non-transitory computer-readable medium of claim 12, wherein the computer-executable instructions further cause the processor or the controller to calculate the restricted area based on at least one of a number of tracks on the at least one disk, a number of non-defective sectors, an average number of sectors per track, an average number of non-defective sectors in a zone of tracks, a number of zones of tracks per area on the at least one disk having the same number of sectors per track, and a number of tracks per zone of tracks.

* * * * *